United States Patent
Groff et al.

(10) Patent No.: US 7,707,599 B1
(45) Date of Patent: Apr. 27, 2010

(54) CUSTOMER SUPPORT SERVICES VIA A CABLE SERVICES NETWORK

(75) Inventors: Vincent Groff, Dunwoody, GA (US); Steve Calzone, Duluth, GA (US); John Kelly King, Asheville, NC (US); Bruce Beeco, Buford, GA (US)

(73) Assignee: Cox Communications, Inc., Atlanta, GA (US)

( * ) Notice: Subject to any disclaimer, the term of this patent is extended or adjusted under 35 U.S.C. 154(b) by 1333 days.

(21) Appl. No.: 11/002,912

(22) Filed: Dec. 2, 2004

Related U.S. Application Data

(60) Provisional application No. 60/622,111, filed on Oct. 26, 2004.

(51) Int. Cl.
*H04N 7/16* (2006.01)

(52) U.S. Cl. .......................................... 725/5; 715/700

(58) Field of Classification Search ................. 725/1–8, 725/60, 61, 86, 104; 715/700, 716, 719
See application file for complete search history.

(56) References Cited

U.S. PATENT DOCUMENTS

| | | | |
|---|---|---|---|
| 5,815,195 A | 9/1998 | Tam | 725/86 |
| 6,177,931 B1 | 1/2001 | Alexander et al. | 725/52 |
| 6,275,268 B1 * | 8/2001 | Ellis et al. | 348/564 |
| 6,438,596 B1 | 8/2002 | Ueno et al. | 709/226 |
| 6,639,975 B1 * | 10/2003 | O'Neal et al. | 379/112.01 |
| 6,718,551 B1 | 4/2004 | Swix et al. | 725/32 |
| 7,076,544 B2 | 7/2006 | Katz et al. | 709/223 |
| 7,428,503 B1 | 9/2008 | Groff et al. | 705/26 |
| 2001/0014975 A1 | 8/2001 | Gordon et al. | 725/91 |
| 2002/0049624 A1 | 4/2002 | Raveis | 705/8 |
| 2002/0049977 A1 | 4/2002 | Miller et al. | 725/82 |
| 2002/0069420 A1 | 6/2002 | Russell et al. | 725/92 |
| 2002/0078453 A1 | 6/2002 | Kuo | 725/46 |
| 2002/0129375 A1 | 9/2002 | Kim et al. | 725/100 |
| 2002/0169656 A1 | 11/2002 | Al-Azzawe | 705/10 |
| 2003/0046700 A1 | 3/2003 | Wilcox et al. | 725/60 |
| 2003/0084449 A1 | 5/2003 | Chane et al. | 725/46 |
| 2003/0200159 A1 | 10/2003 | Kay et al. | 705/28 |
| 2003/0229898 A1 | 12/2003 | Babu et al. | 725/87 |
| 2004/0187159 A1 | 9/2004 | Gaydos et al. | 725/92 |
| 2005/0160458 A1 | 7/2005 | Baumgartner | 725/46 |
| 2005/0172325 A1 | 8/2005 | Henry et al. | 725/116 |
| 2005/0256952 A1 | 11/2005 | Mouhanna et al. | 709/223 |
| 2006/0248555 A1 | 11/2006 | Eldering | 725/34 |
| 2006/0293971 A1 | 12/2006 | Hunter et al. | 705/26 |

OTHER PUBLICATIONS

U.S. Appl. No. 11/035,678 filed Jan. 13, 2005, entitled "Intelligent Asset Management in a Cable Services System".

(Continued)

*Primary Examiner*—Andrew Y Koenig
*Assistant Examiner*—Aklil Tesfaye
(74) *Attorney, Agent, or Firm*—Merchant & Gould

(57) ABSTRACT

Methods and systems provide customer support services through interactive television sessions via a cable services network. Cable services customers may pay bills or enroll in automatic bill payment via interactive television sessions. Information on pending work orders, answers to frequently asked questions and helpful service provider contact information may be obtained from a data services system through an interactive television session via a cable services network.

40 Claims, 11 Drawing Sheets

OTHER PUBLICATIONS

U.S. Appl. No. 10/885,292 filed Dec. 2, 2004, entitled "Preparation and Utilization of Customer Profile Data in a Cable Services Network".

U.S. Office Action dated Aug. 20, 2007 cited in U.S. Appl. No. 11/002,913.

U.S. Office Action dated Feb. 22, 2008 cited in U.S. Appl. No. 10/885,292.

U.S. Final Office Action dated Aug. 5, 2008 cited in U.S. Appl. No. 11/035,678.

U.S. Final Office Action dated Oct. 15, 2008 cited in U.S. Appl. No. 10/885,292.

U.S. Final Office Action dated Mar. 30, 2009 cited in U.S. Appl. No. 11/035,678.

U.S. Office Action dated Sep. 15, 2009 cited in U.S. Appl. No. 11/035,678.

U.S. Office Action dated Oct. 26, 2009 cited in U.S. Appl. No. 10/885,292.

* cited by examiner

CUSTOMER SUPPORT SERVICES VIA A CABLE SERVICES NETWORK

RELATED APPLICATIONS

This application claims the benefit of U.S. Provisional Application, entitled "Improved Customer Support Services Via a Cable Services Network", filed with the U.S. Patent and Trademark Office on Oct. 26, 2004, and assigned U.S. Ser. No. 60/622,111.

FIELD OF THE INVENTION

The present invention generally relates to provision of customer support services through an interactive television session via a cable services network.

BACKGROUND OF THE INVENTION

With the advent of cable television networks, cable customers have grown accustomed to receiving a variety of television programming from numerous broadcasting sources. In recent years, technology advances have enabled customers to receive an even greater variety of products and services through cable services networks. Modern cable services networks provide traditional video television programming, telephone services, high speed Internet access, electronic mail services, video-on-demand, information services, and the like. Through the use of set-top boxes (computing systems) cable services providers can provide interactive television services to customers. Such interactive television services allow customers to interact directly with services providers in response to services and product offerings presented to the customers through their personal television sets.

With the increase in the availability of and subscription to various cable services and products, customers require significantly greater access to cable services providers for customer support services. For example, customers often need to contact their cable services providers regarding billing and bill payment issues, customers often desire frequently asked questions, or customers may need contact information for one or more offices/departments operated by their cable services provider.

In a typical setting, a cable services customer must call a general cable services telephone number followed by an extended holding period, or the customer may be transferred to many different offices/departments before the customer receives the desired customer support services. In the case of billing issues, the customer may need to quickly process a billing payment, but is restrained by the requirement to physically mail or hand-deliver a payment to the services provider.

Accordingly, there is a need for an improved customer support services method and system that allows for efficient provision of customer support services via a cable services network. It is with respect to these and other considerations that the present invention has been made.

SUMMARY OF THE INVENTION

Embodiments of the present invention solve the above and other problems by a method and system for providing customer support services through an interactive television session via a cable services network. According to general aspects of the invention, a cable services customer may access a variety of customer support services of his/her cable services provider via an interactive television session.

If the customer desires to check billing information or pay a pending bill, the customer may request billing data from a billing service via a web services system. Billing data is formatted and is presented to the customer at the customer's local television set via a cable services set-top box that interfaces the customer's television set with the cable services system. If the customer desires to pay a bill through an interactive television session, the customer is provided one or more user interfaces for entering banking account or credit card information and an amount of payment. Payment information provided by the customer is submitted to the cable services system billing system, and a confirmation of the payment information is processed via a web services system. If the payment information submitted by the customer is acceptable, the payment is processed, and the payment confirmation is presented to the customer.

According to another aspect of the invention, a cable services customer may enroll in an automatic bill payment system via an interactive television session. A list of customer accounts are provided to the customer from the cable services system billing system via a web services system. The customer may select to enroll in an automatic bill payment system for one or all of the customer's cable services accounts. Through a user interface presented to the customer at the customer's local television set, the customer may provide banking account or credit card information for automatically paying selected accounts on a periodic basis. Confirmation of the information provided by the customer is performed at the cable services billing system via the web services system.

According to other aspects of the invention, cable services customers may obtain general customer support services information including work order status information, answers to frequently asked questions, contact information for various offices/departments of the cable services provider, and the like via an interactive television session. Such customer support information may be obtained from a variety of information services through a web services system. Once desired customer support information is obtained, the information may be formatted and presented to a requesting customer at the customer's local television set.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

Figure 1:
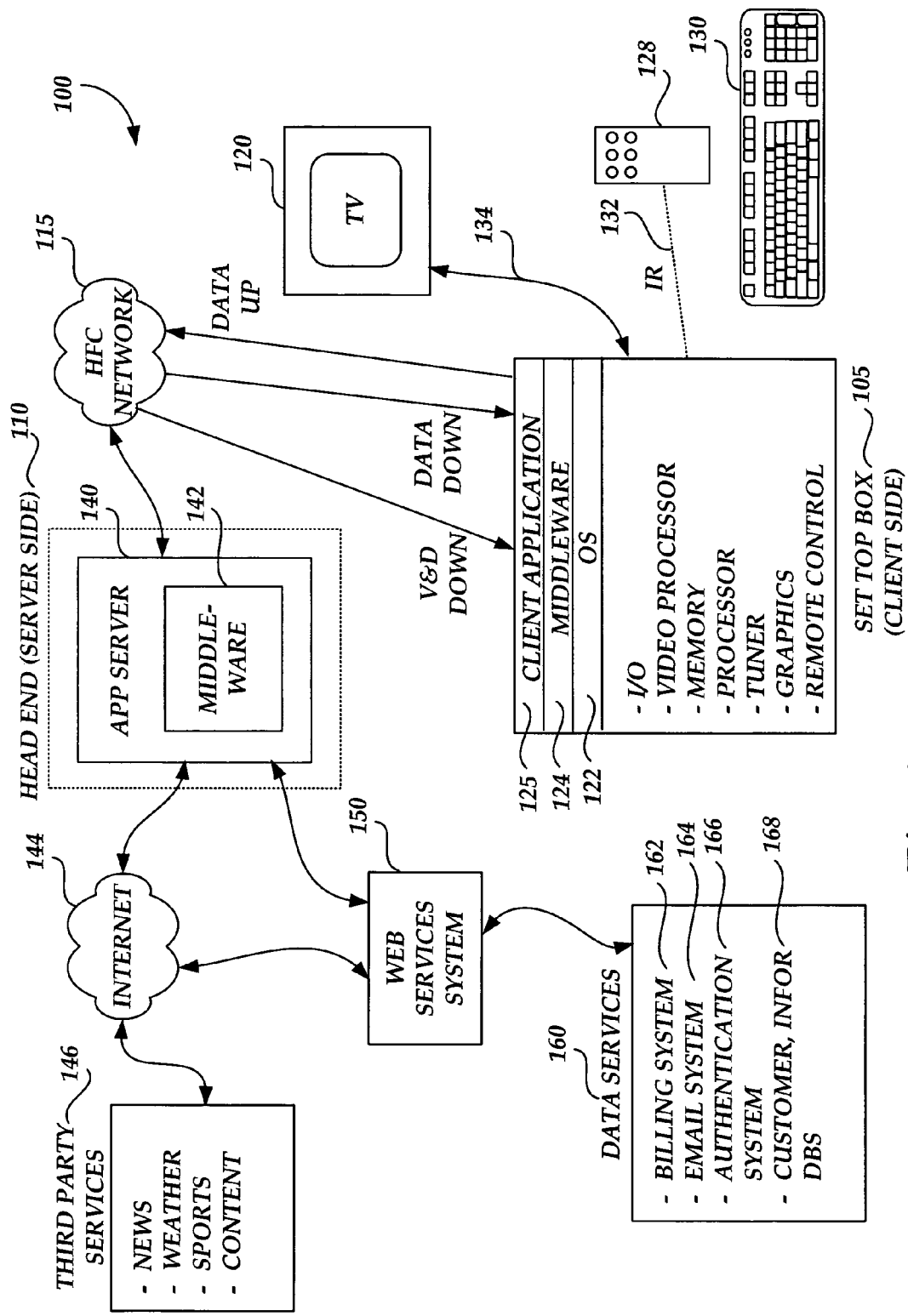
FIG. 1 is a simplified block diagram illustrating a cable services network architecture that serves as an exemplary operating environment for the present invention.

As briefly described above, embodiments of the present invention are directed to methods and systems for providing customer support services through an interactive television session via a cable services network. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. Referring now to the drawings, in which like numerals refer to like elements throughout the several figures, aspects of the present invention and an exemplary operating environment will be described.

Operating Environment

Embodiments of the present invention may be implemented in a number of distributed computing environments where functionality is tailored for provision of customer support services. According to an actual embodiment, the present invention is implemented in a cable television/services system. FIG. 1 is a simplified block diagram illustrating a cable television/services system 100 (hereafter referred to as "CATV") architecture that serves as an exemplary operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
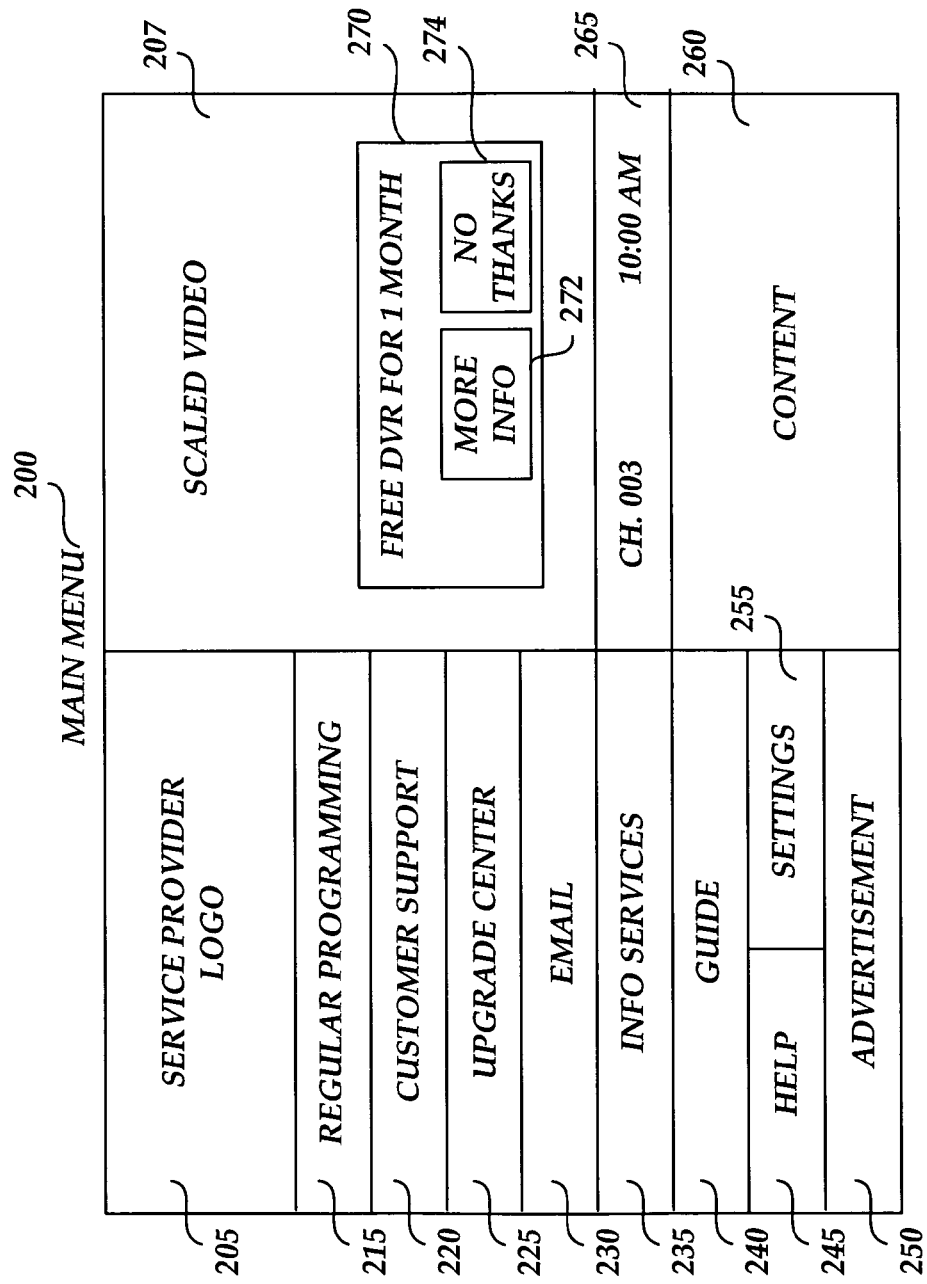
FIG. 2 is a simplified block diagram illustrating a television screen display of an interactive television services main menu according to embodiments of the present invention.

FIG. 2 is a simplified block diagram illustrating a television screen display of an interactive television services main menu according to embodiments of the present invention. Referring to FIG. 2, a client application 125 operating on the set-top box 105 may cause the presentation of a variety of menus that are displayed to the customer on the customer television 120. For example, the main menu 200 illustrated in FIG. 2 is representative of a first or main menu from which a customer may select other services provided by the customer's cable television services provider, or through which the customer may be provided targeted advertising and/or information content. As should be understood, the layout and content illustrated in FIG. 2 is for purposes of example only and is not limiting of the variety of different layouts and types of content that may be included in such a menu according to embodiments of the present invention.

The main menu television screen display 200 includes a service provider logo area 205 in the upper left-hand corner where the service provider may include their name, trademark or other identifying logo. A number of selectable buttons are provided with which the customer may select functionality from the main menu using the customer's remote control 128. For example, a regular programming button 215 is illustrated for allowing the user to dismiss the main menu screen and return to regular full-screen video programming. According to embodiments of the present invention, a customer support button 220 is provided for allowing the user/customer to select a customer support application for obtaining information about services or products associated with the customer's cable television services subscription. An upgrade center button 225 is provided for allowing the user to launch a menu with which the user may upgrade or otherwise change subscribed services or products. An electronic mail button 230 is provided for allowing the user to launch an electronic mail session with which the user may review and dispose of electronic mail messages received via the electronic mail system 164.

A guide button 240 is provided for allowing the subscriber to receive helpful information such as television listings, services and product offerings, and the like. A help button 245 is provided for allowing the user to obtain helpful information regarding utilization of subscribed services. A settings button 255 is provided for allowing a user to check and modify subscribed services settings. A scaled video pane 210 is illustrated in which video programming is displayed while the user is viewing other portions of the main menu display 200. For example, a television channel last viewed by the customer prior to selection of the main menu display 200 may be presented to the user in the scaled video pane 210 to prevent the user from missing desired portions of a video presentation.

An advertisement pane 250 provides a space for targeted advertisement directed to the customer. If no targeted advertisement content is available or appropriate, the advertisement pane 250 may be populated with a default advertisement that is not specific to the customer of the main menu 200. A content pane 260 is provided for displaying informational content to a customer. The content may be targeted to a specific customer based on customer profile data maintained for the customer in a customer profile. For example, weather information keyed to a customer's home address or ZIP code may be obtained from a third-party services system 146 and may be displayed in the content pane 260. If no customer profile data is available for a given customer, or if a default customer profile is prepared for a given customer, default content may be displayed to the customer in the content pane 260.

Customer Support Services

Having described an exemplary operating environment for embodiments of the present invention and a cable services main menu for providing interactive television services, the following is a description of customer support services that may be provided to a cable services customer via an interactive television session. As briefly described above, often a cable services customer desires to pay a cable services bill for one or more services accounts, but the customer is restrained from mailing or hand-delivering a bill payment. According to an embodiment of the present invention, the customer may pay a bill via an interactive television services session. To initiate a bill payment session, the customer may select the customer support button 220 from the main menu 200, illustrated in FIG. 2, to launch a customer support user interface onto the customer's local television set 120 from the set-top box 105, as described above with reference to FIG. 1.

Figure 3:
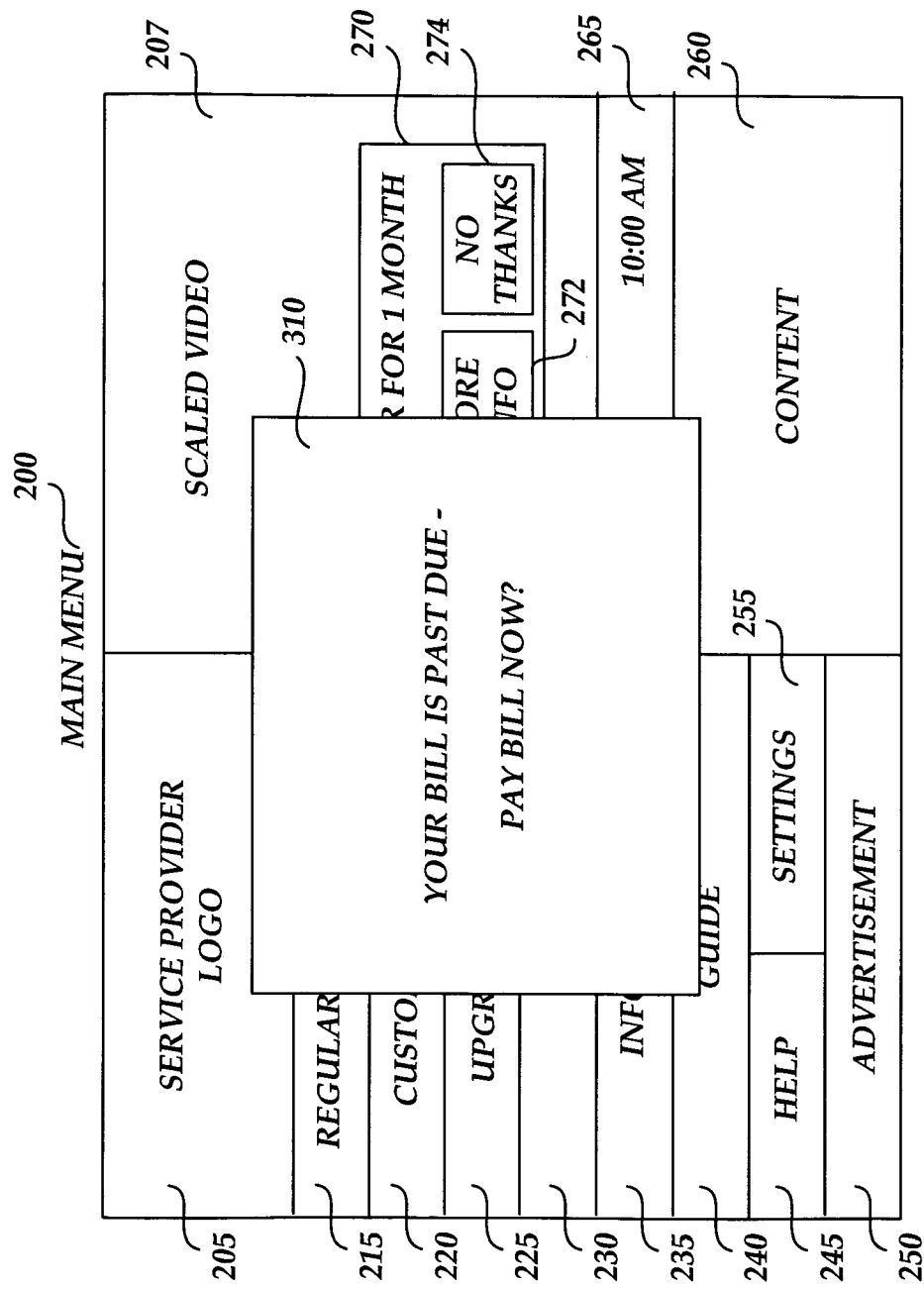
FIG. 3 is a simplified block diagram illustrating a television screen display of an interactive television services main menu and showing a pop-up dialog box for offering access to customer services for bill payment according to embodiments of the present invention.

Alternatively, if the customer's bill payment is past due, the cable services provider may automatically launch a reminder dialog box 310 onto the customer's television screen, as illustrated in FIG. 3, to alert the customer that bill payment is past due. According to this alternative embodiment, the customer may dismiss the dialog box 310 and select the customer support button 220 to launch the customer support user interface described below with reference to FIG. 3A. Alternatively, selection of the dialog box 310 may be utilized by the cable services provider to automatically launch the customer support user interface for allowing the customer to pay the customer's bill via the interactive television session.

Figure 3A:
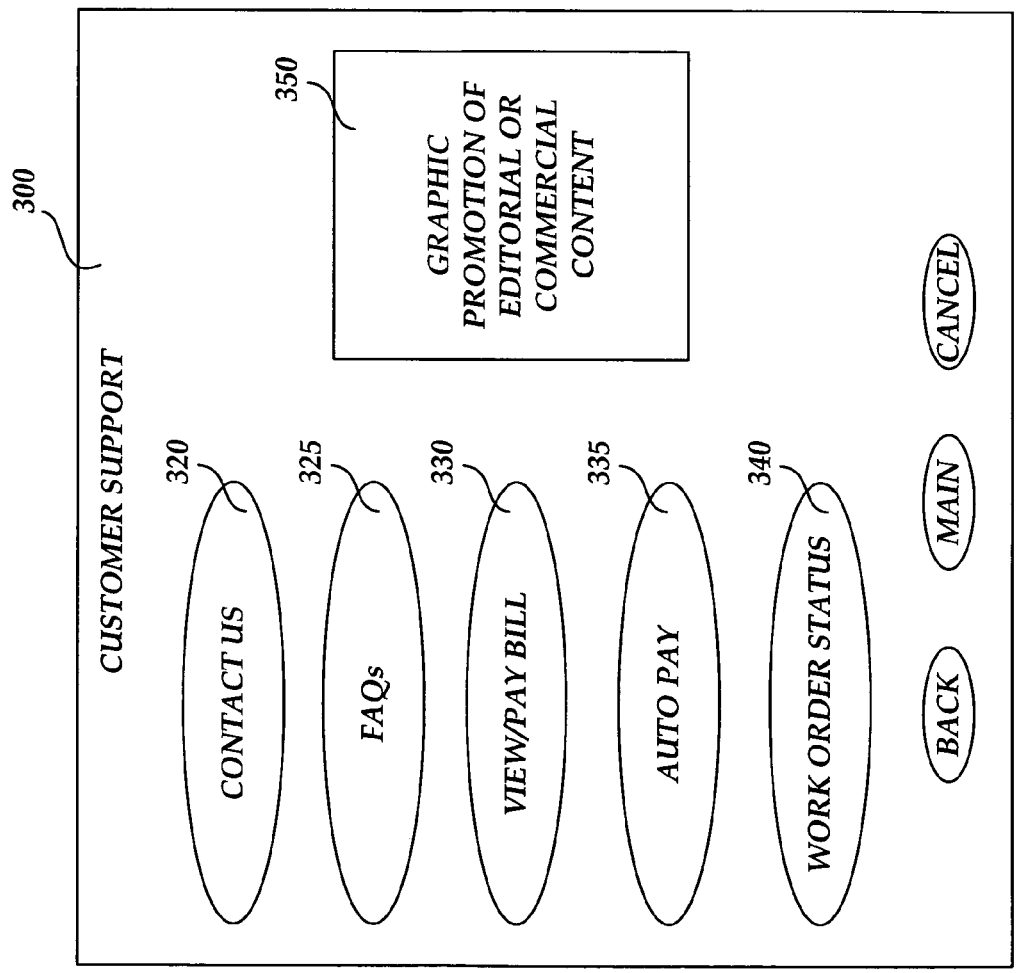
FIG. 3A is a simplified block diagram illustrating a television screen display of a customer support services user interface according to embodiments of the present invention.

As set forth above, selection of the customer support button 220 from the main menu 200, or selection of the past due bill reminder dialog box 310, illustrated in FIG. 3, may be used to launch a customer support user interface 300, illustrated in FIG. 3A, for allowing the user to access a variety of customer support services including viewing and paying customer services bills. As shown in FIG. 3A, the customer support user interface 300 includes a "Contact Us" button 320 for allowing a user to obtain useful contact information for the cable services provider. A "Frequently Asked Questions" button 325 allows the user to obtain answers to frequently asked questions.

A "View/Pay Bill" button 330 allows a user/customer to initiate an interactive television session for paying one or more customer services bills. An "Auto Pay" button 335 may be selected by the customer for enrolling in an automatic bill payment system. A "Work Order Status" button 340 may be selected by a customer to obtain information on pending work orders associated with services/products orders placed by the customer. Also illustrated in FIG. 3A is an information pane 350 in which editorial or commercial content may be displayed by the cable services provider. For example, advertisements, public service announcements, information regarding customer support services, and the like may be included in the pane 350. As should be understood by those skilled in the art, the customer support services button 320-340, illustrated in FIG. 3A, are for purposes of example only and are not limiting of the customer support services functionalities that may be made available to the customer and that may be selected via the customer support user interface 300.

Figure 4:
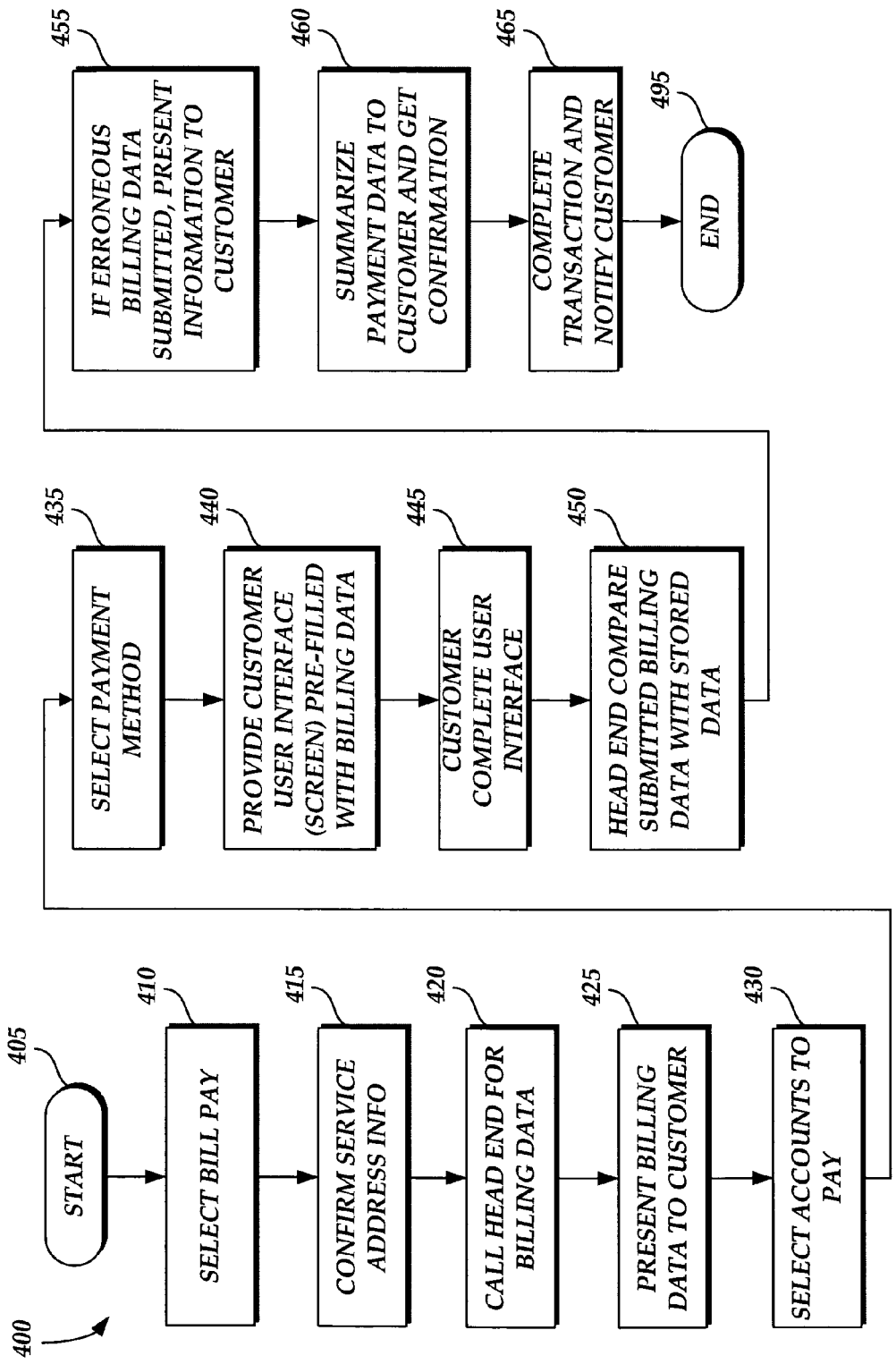
FIG. 4 is a flow diagram showing an illustrative routine for paying a cable services bill via an interactive television session.

FIG. 4 is a flow diagram showing an illustrative routine for paying a cable services bill via an interactive television session. The routine 400 begins at start block 405 and proceeds to block 410 where a cable services customer decides to pay a bill for one or more cable services accounts via an interactive television services session as described herein. At block 410, the cable services customer may select the customer support button 220 from the main menu 200, or alternatively, the customer may select the past due dialog box 310, illustrated in FIG. 3, for automatically launching the customer support user interface 300. According to embodiments of the present invention, the customer support user interface 300 is presented to the customer at the customer's local television set 120 from the set-top box 105, as described above with reference to FIG. 1.

Once the customer support user interface 300 is presented to the customer at the customer's television set 120, the customer may select from the presented functionalities using the customer's remote control device 128. In the case of bill payment, the customer may select the "View/Pay Bill" button 330 for paying a bill via an interactive television session. Upon selection of the "View/Pay Bill" button 330, the routine proceeds to block 415, and the customer's service address information is presented to the customer in a user interface at the customer's television set 120. As should be understood by those skilled in the art, the service address information may be populated into an appropriate user interface at the set-top box based on an identification of the set-top box relative to a service address at which the set-top box is installed. If the customer confirms that the address information presented at the customer's television set 120 is accurate, a query is sent from the set-top box 105 to the cable services network head end (server side) 110 of the cable services network 100 to retrieve billing data for the customer as identified by the set-top box 105 associated with the customer.

At block 420, the application server 140 passes a query for billing data associated with the customer to the web services system 150. The web services system 150 passes a database query to the billing system 162 of the data services system 160 to request billing data for the identified customer. At block 425, the billing data from the billing system 162 is returned to the application server 140 via the web services system 150. At the application server 140, the billing data is formatted for presentation to the customer via the set-top box 105. If the customer subscribes to multiple cable services, for example, cable services, telephone services, high speed Internet services, advanced cable services, and the like, billing information for each of the various cable services may be presented to the customer at the customer's television set 120.

Figure 5:
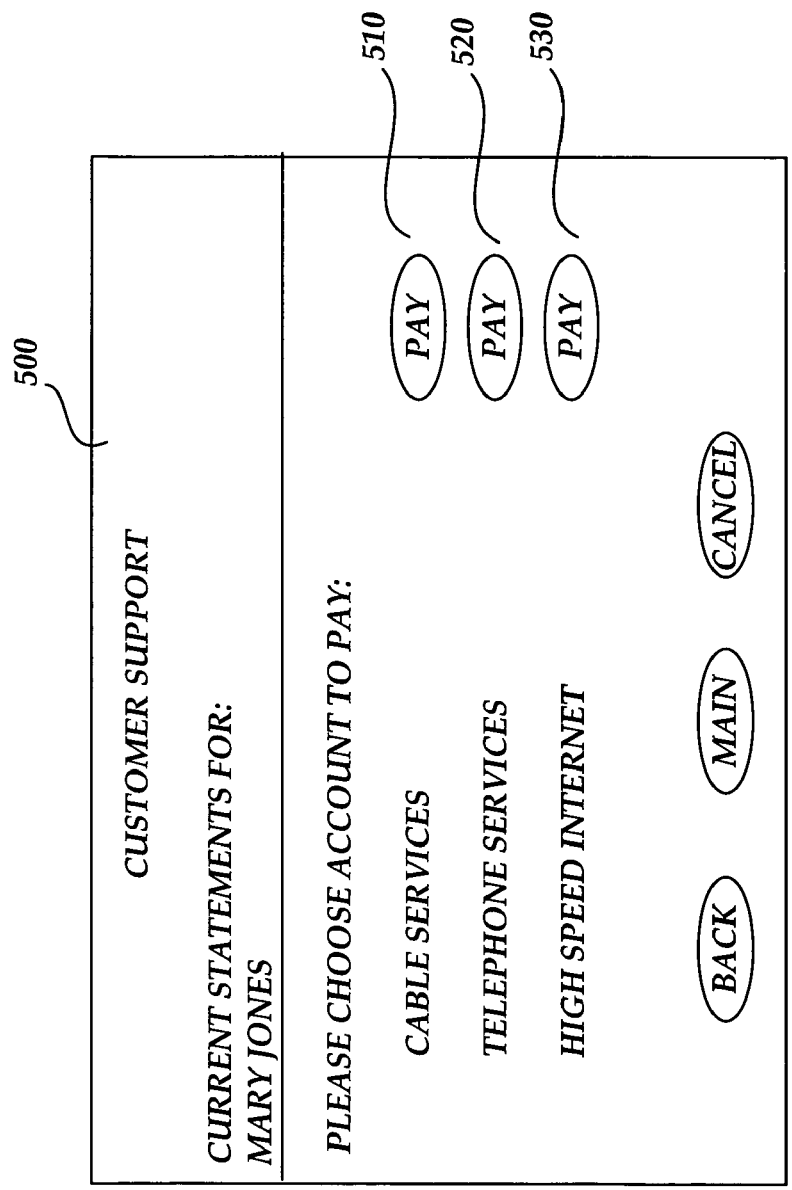
FIG. 5 is a simplified block diagram illustrating a television screen display of an interactive customer support menu according to embodiments of the present invention.

Referring to FIG. 5, a billing data user interface 500 is illustrated for providing billing data to a customer at block 425 (FIG. 4). For example, referring to the billing data user interface 500, an example customer may have a cable services account 510, a telephone services account 520 and a high speed Internet services account 530. Included adjacent to each identified services account is a "pay" button that may be selected by the customer using the customer's remote control device 128 for initiating payment of the selected account via the interactive television session. As should be understood, the cable services accounts illustrated in FIG. 5 are for purposes of example only and are not restrictive of the variety of services/products accounts that may be included in the user interface 500 for a given customer. In addition to individual services accounts, a bill payment button may be included for allowing a customer to pay all outstanding cable services accounts with a single payment selection.

Referring back to FIG. 4, at block 430, the cable services customer selects one or more cable services accounts from the user interface 500 for payment via an interactive television session. In response, at block 435, the customer may be presented with an additional user interface allowing the customer to select a bill payment method from a banking account (electronic debit), credit card, or last method of payment. For example, if the customer has previously utilized the interactive television session bill payment method, described herein, the customer may be presented with the option of paying the selected bills utilizing the last method of payment, such as checking account or credit card.

Once the user selects a method of payment from the available methods of payment, the routine proceeds to block 440, and the customer may be presented with another user interface containing data fields appropriate for the selected method of payment. For example, if the user selected payment by credit card, a credit card number field may be presented for allowing the customer to enter the customer's credit card numbers and credit card expiration date using the remote control device 128. According to one embodiment of the present invention, certain data fields, for example, current balance due, minimum amount due, and amount to be paid may be pre-populated by the set-top box 105 from billing data retrieved at block 420. For example, a current balance due field may be populated with the total amount currently due by the customer. A minimum due field may be populated with a minimum amount required by the cable services provider, and the amount to be paid field may be pre-populated with an amount such as the minimum amount due. As should be understood by those skilled in the art, a field such as the amount to be paid field may be populated manually by the customer, the customer may accept the amount pre-populated into the field, or the customer may manually edit the amount pre-populated into the field.

If the customer has selected a different method of payment, for example, payment from a banking account (checking account), other data fields may be presented to the customer including a data field for entry of the customer's banking routing number, checking account number, check number, and the like. According to embodiments of the present invention, if the customer selects a payment method of "last method used," the user interface presented to the customer will be a user interface associated with the last method of payment utilized by the customer. For example, if the customer paid his/her last bill using a credit card, then a user interface associated with payment via credit card will be presented to the customer. In addition, because the customer provided required information such as credit card account number, expiration date, etc. during the last payment of the customer's bill, that information may be pre-populated into the user interface provided to the customer.

At block 445, the customer completes the payment method user interface, as described above, and submits the completed user interface to the cable services provider for payment of the selected account. At block 450, the completed bill payment information is submitted to the application server 140 via the HFC network 115 from the set-top box 105 in order to submit the bill payment information to the billing system 162. According to one embodiment of the present invention, prior to accepting the bill payment information provided by the customer, the application server 140 may query the billing system 162 via the web services system 150 to determine the accuracy of information provided by the customer. For example, a determination may be made as to whether a credit card number and associated expiration date are valid for the identified customer. For another example, a banking routing number supplied by the customer may be checked against a database of routing numbers to determine whether the routing number supplied by the customer is a valid banking routing number.

The query from the application server 140 may be sent to a variety of information services systems via the web services system 150 for determining the accuracy and validity of payment information supplied by the customer. For example, a credit card or banking clearing house data services system may be queried to determine whether any security or fraud alerts have been issued relative to the identified customer or the supplied account information. If the customer selects the last method used for payment of a present services bill, the credit card or banking account information supplied by the customer may be compared against information maintained for the customer at the set-top box 105 without the need for querying data services through the head end of the cable services network 100.

At block 455, if erroneous billing data has been supplied by the customer, for example where a supplied credit card account number does not match a supplied credit card expiration date, an error message may be presented to the customer at the customer's television set 120 to alert the customer of data fields supplied by the customer that are erroneous. For example, if a minimum payment due for a selected services account is $75.00 and the customer enters a payment amount of $65.00, an error message may be presented to the customer notifying the customer that the customer may not make a payment for the selected account of less than the minimum payment due of $75.00. In response to the error message, the customer may correct erroneous data and resubmit the billing data to the billing system as described above with respect to block 445.

Once the payment information supplied by the customer is determined to be valid, the routine proceeds to block 460. At block 460, a next user interface or display screen may be presented to the customer at the customer's television set 120 summarizing the selected accounts and summarizing the payment information supplied by the customer. If the customer confirms the summarized payment data by selecting that the interactive bill payment session should continue, the routine proceeds to block 465, and the transaction is completed. At block 465, the confirmed payment data is forwarded to the application server 140 by the set-top box 105. The application server 140 in turn queries the billing system 162 via the web services system 150 to request that the bill payment process be completed according to the payment data confirmed by the customer.

Once the billing system 162 completes processing the payment by charging the account provided by the customer and by updating the customer's billing records to indicate payment of the selected accounts, a notification message may be returned to the application server 140 from the billing system 162 via the web services system 150. The application server 140 may in turn format a notification message to present to the customer at the customer's television set 120 via the set-top box 105 to notify the customer of the completed transaction. As should be understood, the summarization of payment data presented to the customer at block 460 may be omitted, and the customer may be notified of a completed transaction immediately upon confirmation that the payment data presented by the customer is valid. The routine ends at block 495.

Referring back to FIG. 3A, according to embodiments of the present invention, another customer support service the customer may provision via an interactive television session includes an automatic payment plan for payment of the customer's one or more services accounts from a banking account or credit account supplied by the customer. In order to enroll in an automatic payment plan, the customer may select the "Auto Pay" button 335 from the customer support user interface 300 to initiate an interactive television session doing which the customer may enroll in the automatic payment plan. Alternatively, after a customer has paid one or more services accounts via an interactive television session, as described above with reference to FIGS. 4 and 5, a customer may be provided with a user interface display or dialog box notifying the customer that the customer can avoid the effort of future manual or interactive payments by enrolling in an automatic payment plan. Alternatively, a promotion pane 350 may be provided in one of a variety of different user interfaces provided to the customer that may be used by the cable services provider to offer an automatic payment plan to the customer. Selection of the promotional pane may be utilized by the cable services provider to automatically initiate an automatic payment enrollment process for the customer.

Figure 6:
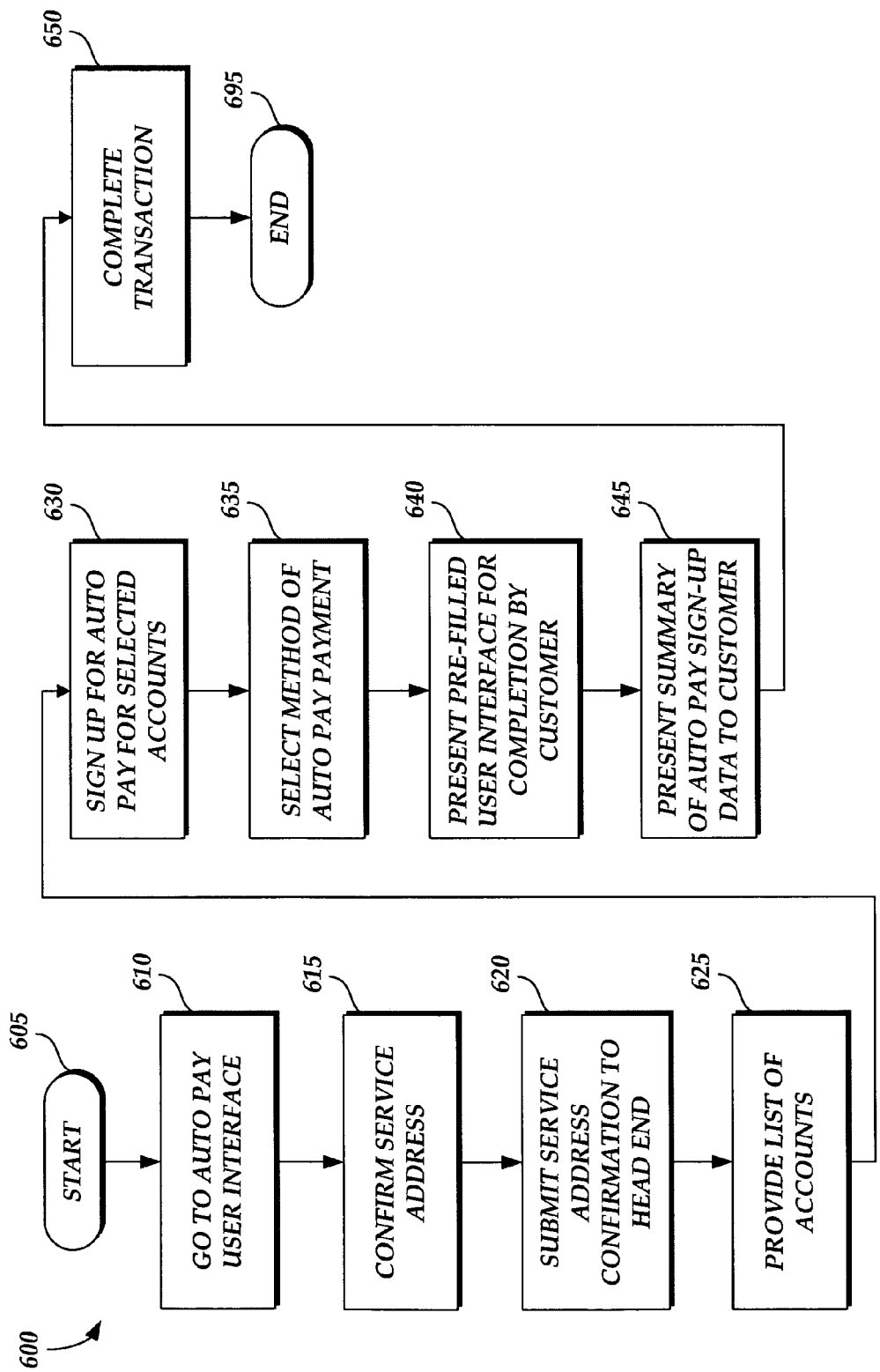
FIG. 6 is a flow diagram showing an illustrative routine for enrolling in an automatic bill payment system via an interactive television session.

FIG. 6 is a flow diagram showing an illustrative routine for enrolling in an automatic bill payment system via an interactive television session. The routine 600 begins at start block 605 and proceeds to block 610 where the cable services customer decides to enroll in an automatic payment plan for payment of future bills by the customer. As described above, the customer may initiate the process of enrolling into the automatic payment plan in a number of ways. The customer may select the customer support button from the main menu 200 to launch the customer support user interface 300. Upon receipt of the customer support user interface 300, the customer may select the "Auto Pay" button 335 to initiate an enrollment process. Alternatively, a customer may respond to a promotional dialog box presented to the customer during payment of a bill, or the customer may initiate the automatic payment plan enrollment process by responding to an advertisement pane 350.

Figure 7:
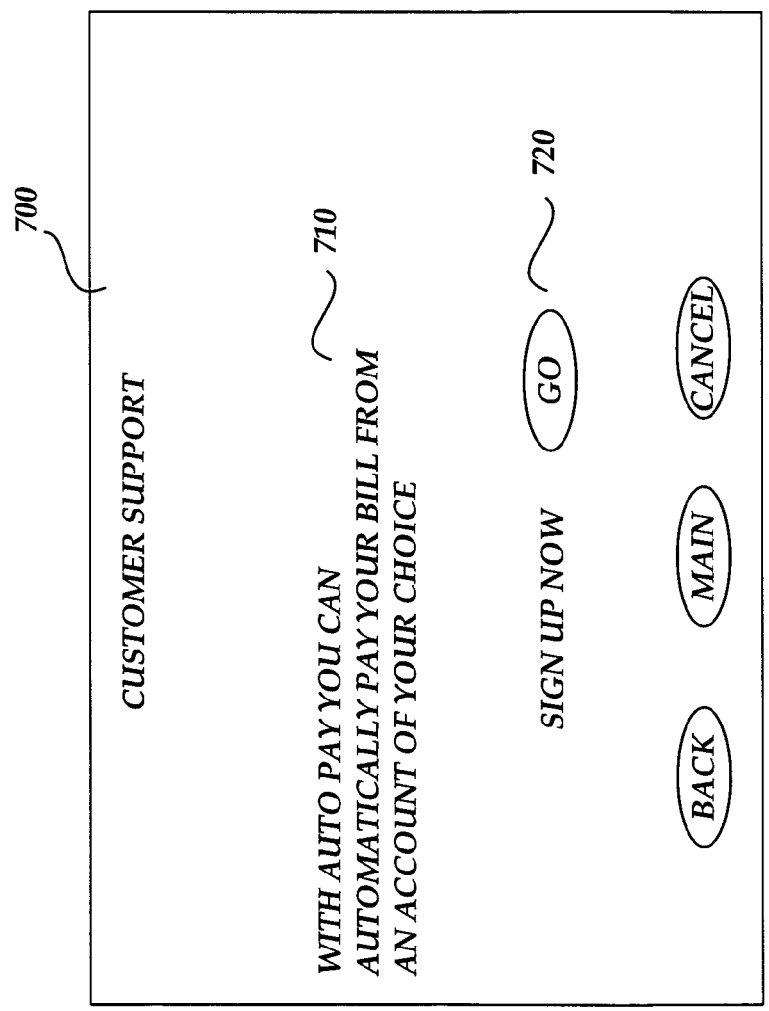
FIG. 7 is a simplified block diagram illustrating a television screen display of an interactive television services automatic payment enrollment menu according to embodiments of the present invention.

Referring back to FIG. 6, once the customer selects to initiate enrollment into the automatic payment plan, a user interface or display screen such as the user interface 700, illustrated in FIG. 7, may be presented to the customer at the customer's television set 120 by the set-top box 105. Referring to FIG. 7, the user interface 700 may be utilized by the cable services provider to provide the customer with useful information describing the automatic payment plan and a method for initiating the enrollment process. For example, the user interface 700 includes an information area 710 for providing information about the automatic payment plan and a button 715 for allowing the customer to select the enrollment process using the customer's remote control device 128.

Referring back to FIG. 6, once initiation of the automatic payment plan enrollment process is selected, the customer service address for the associated set-top box 105 is presented to the customer at the customer's television set 120. If the customer confirms the service address, the service address information is forwarded to the application server 140 at the cable services network head end 110 for retrieving a list of cable services accounts to which the automatic payment plan may be applied by the customer. At block 620, the application server 140 queries the billing system 162 via the web services system 150 to obtain a list of cable services accounts associated with the confirmed service address.

At block 625, the billing system returns a list of cable services accounts, for example, telephone services, cable services, high speed Internet services, and the like, to the application server 140 via the web services system 150. The application server 140 formats the information retrieved from the billing system 162 for presentation to the customer at the customer's television set 120. For example, a user interface or display screen may be formatted to provide the customer a list of cable services currently subscribed to by the customer and to provide a selectable control, such as a button, to allow the customer to select one or more of the subscribed cable services for enrollment into the automatic payment plan.

At block 630, the customer selects one or more of the listed cable services for enrollment into the automatic payment plan. In response, the set-top box 105 presents the customer with a user interface through which the customer then selects a method of payment to be used by the automatic payment plan. For example, as described above with reference to FIG. 4, the customer may be allowed to select from a variety of automatic payment methods including banking accounts, credit card accounts, and the like. In addition, if the customer has previously paid a services bill via an interactive television session, the customer may be allowed to select the last method of payment as the method with which future payments will be made under the automatic payment plan. As should be understood, during the interactive payment process described above with reference to FIG. 4, a customer may be provided the opportunity to enroll into an automatic payment plan utilizing the payment information provided by the customer.

Once the customer selects a method of automatic payment, the routine proceeds to block 640, and the customer is presented with a pre-filled user interface or display screen for completion by the customer, as described above with reference to block 440 (FIG. 4). That is, a user interface associated with the method of payment selected by the customer (e.g., banking account, credit card account, etc.) is provided to the customer for completion by the customer. For example, if the customer selects a credit card method of payment, the user interface provided to the customer may include data fields for entry of a credit card number, credit card expiration date, and other required identification information.

After the method of payment user interface is completed by the customer, or if a pre-populated user interface is provided to the customer based on a last method of payment used, the completed payment information is submitted by the set-top box 105 to the head end 110 of the cable services network 100. The application server 140 then may submit the information via the web services system 150 to the billing system 162 or to a banking or credit card clearing house for verifying the accuracy and/or validity of the information provided by the customer (e.g., credit card expiration dates, credit card numbers, bank routing numbers, etc.). If erroneous payment information is provided by the customer, an appropriate error message may be formatted by the application server 140 and may be presented to the customer at the television set 120 to notify the customer that information provided by the customer was erroneous. After the customer has corrected any erroneous information, the pertinent information may be resubmitted to the application server 140 for validation.

If valid payment information is provided by the customer, a summary of the automatic payment plan data may be presented to the customer at the customer's television set 120 to confirm to the customer that future payments for the selected accounts will be charged to the banking or credit accounts supplied by the customer. According to one embodiment of the present invention, if the customer selectively confirms the summary of automatic payment enrollment data presented to the customer, the transaction is completed by forwarding the customer's confirmation from the set-top box 105 to the application server 140 and on to the billing system 162 via the web services system 150. Accordingly, all future billing for the selected accounts will be automatically charged to the banking or credit accounts supplied to the billing system 162 by the customer in accordance with the automatic payment plan enrollment data provided by the customer. The routine ends at block 695.

Referring back to FIG. 3A, another customer support service available to the customer includes a determination and presentation to the customer of work order status information for one or more pending work orders associated with the customer's service address. If the customer selects the "Work Order Status" button 340, the set-top box 105 may query the application server 140 at the head end of the cables services network 100 for information regarding pending work orders. For example, the customer may have ordered high speed Internet services, advanced movie channel services, or other services, and the customer may now desire information regarding the status of those pending work orders.

Figure 8:
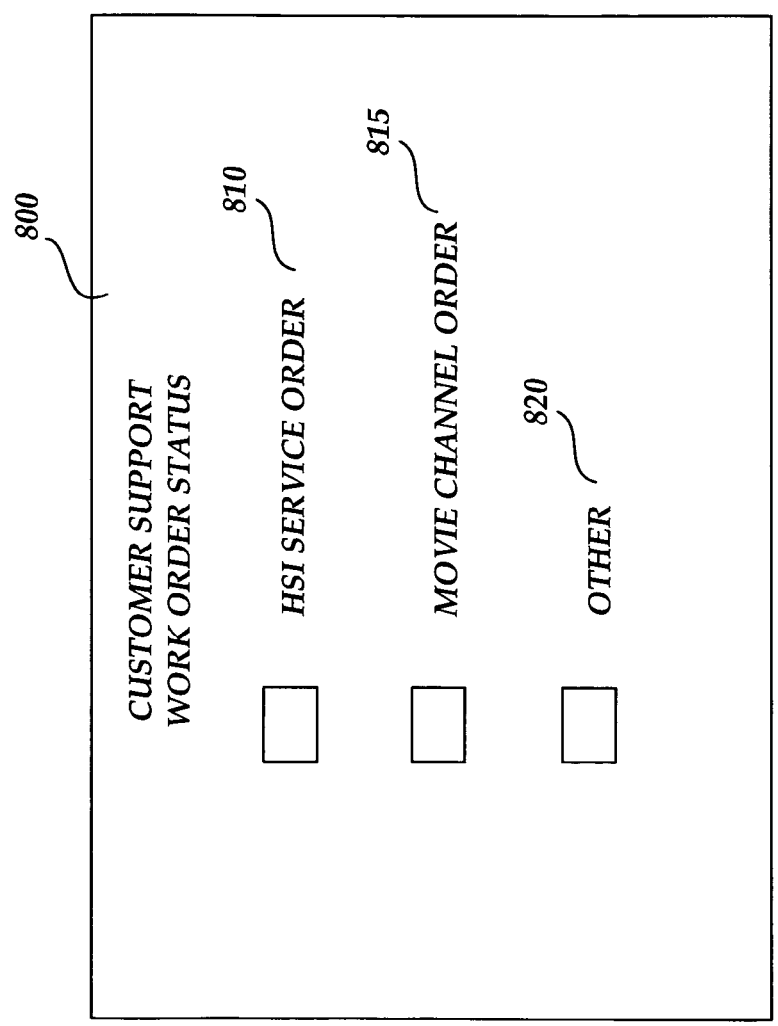
FIG. 8 is a simplified block diagram illustrating a television screen display of an interactive television services work order status information menu according to embodiments of the present invention.

Based on identification information associated with the customer's set-top box 105, the application server 140 may query the data services system 160 via the web services system 150 for information regarding pending work orders associated with the identified customer. Identification information for pending work orders may be forwarded back to the application server 140 via the web services system 150. At the application server 140, a work order status user interface, such as the user interface 800, illustrated at FIG. 8, may be formatted and may be presented to the customer at the customer's television set 120 via the set-top box 105. In response to receiving the user interface 800, the customer may select one or more of the identified work orders for obtaining status information for the selected work orders.

Upon selecting and submitting one or more of the identified pending work orders, a query may be sent from the set-top box 105 to the data services system 160 via the application server 140 and web services system 150 to obtain work order status information for the selected pending work order. Work order status information for the selected work order may then be forwarded back to the application server 140 which may in turn format the information into an appropriate presentation display for displaying to the customer at the customer's television set 120. According to an alternative embodiment, information regarding all pending work orders associated with the identified customer may be forwarded to the set-top box 105 from the data services system 160 and may be stored in memory at the set-top box 105 for retrieval by the customer. That is, all information associated with all pending work orders may be submitted to the set-top box 105 when the customer initially requests work order status information. Then, when the customer selects a particular pending work order, information for the selected work order may be presented to the customer in an appropriate display. Alternatively information regarding pending work orders may be periodically stored at the set-top box 105 for retrieval on a periodic basis by the customer at the customer's television set 120.

Figure 9:
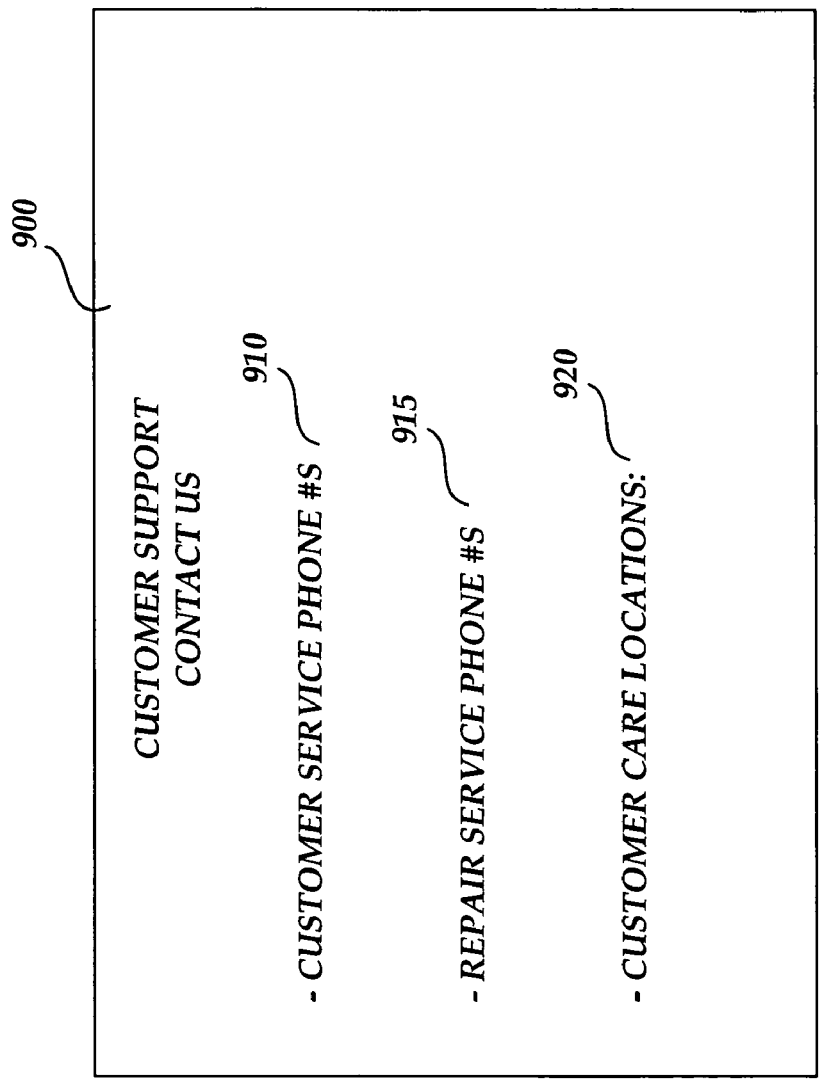
FIG. 9 is a simplified block diagram illustrating a television screen display of an interactive television services contact information menu according to embodiments of the present invention.

Referring back to FIG. 3A, another customer support service available to the customer according to embodiments of the present invention includes contact information for various offices/departments of the cable services provider that may be required from time to time by a given customer. Upon selection of the "Contact Us" button 320, the set-top box 105 may retrieve from local memory at the set-top box 105 contact information for various offices/departments for presentation to the customer. Referring to FIG. 9, a user interface or display screen 900 may be provided to the customer to provide the customer such contact information as customer service phone numbers 910, repair service phone numbers 915, and address information for customer care locations 920. According to an alternative embodiment, selection of the contact information button 320 may cause a query by the set-top box 105 to the head end 110 of the cable services network for obtaining the contact information from the data services system 160 via the web services system 150. Alternatively, the set-top box 105 may periodically poll the data services system 160 via the application server 140 and web services system 150 to obtain updated contact information for storage in local memory at the set-top box 105.

Figure 10:
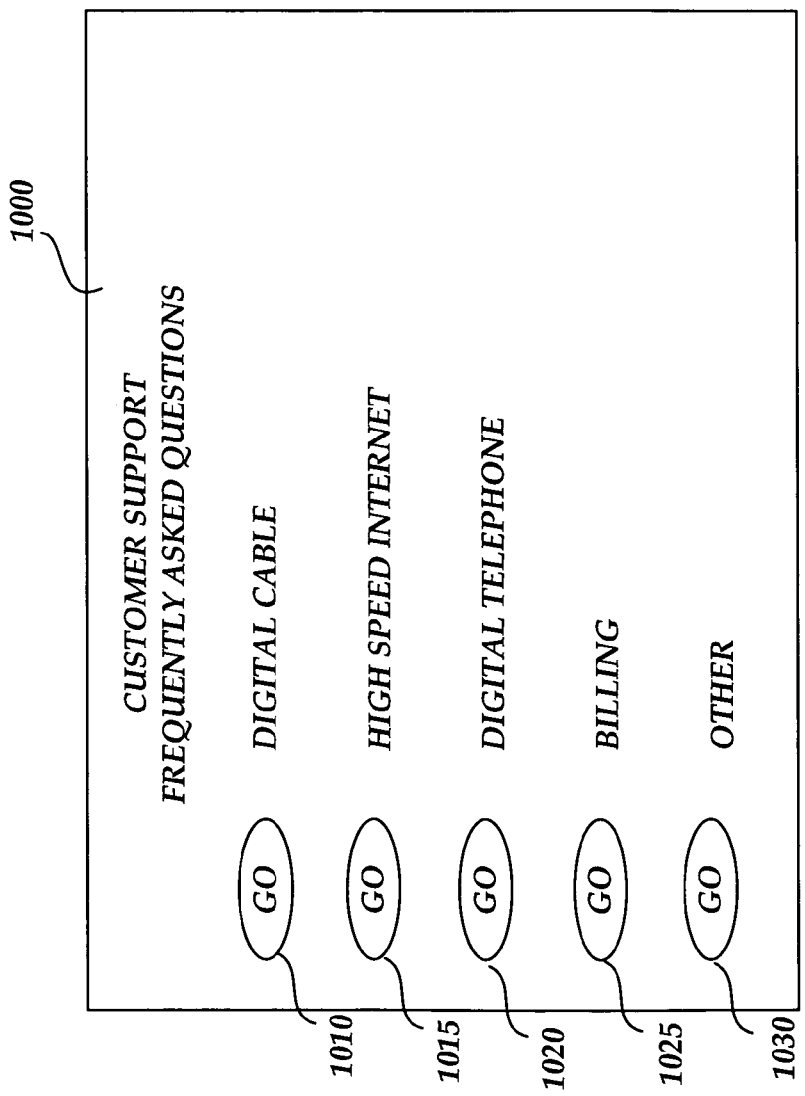
FIG. 10 is a simplified block diagram illustrating a television screen display of an interactive television services frequently asked questions menu according to embodiments of the present invention.

Referring back to FIG. 3A, another customer support service available to the customer includes answers to frequently asked questions. In order to obtain answers to frequently asked questions, the customer may select the "Frequently Asked Questions" button 325. In response to selecting the "Frequently Asked Questions" button 325, a user interface 1000, illustrated in FIG. 10, may be presented to the customer at the customer's television set 120 to allow the customer to obtain answers to frequently asked questions regarding specific question topics. For example, as illustrated in FIG. 10, a customer may select from topics such as "Digital Cable" 1010, "High Speed Internet" 1015, "Digital Telephone" 1020, "Billing" 1025, or "Other" 1030. As should be understood by those skilled in the art, the topics illustrated in the user interface 1000 are for purposes of example only and are not limiting or restrictive of the variety of informational topics that may be provided to the customer.

According to one embodiment of the present invention, information responsive to the frequently asked questions may be stored in local memory at the set-top box 105. Accordingly, when a customer selects a given informational topic, an appropriate user interface may be formatted by the set top box 105 and may be presented to the customer at the customer's television set 120 for providing the customer answers to frequently asked questions for a selected topic. Alternatively, each time a customer selects a given informational topic, the set-top box 105 may query the data services system 160 via the application server 140 and web services system 150 for obtaining answers to the frequently asked questions topic selected by the customer. As should be understood by those skilled in the art, a database may be maintained at the data services system 160 for maintaining answers to selected frequently asked questions. Alternatively, the set-top box 105 may maintain a store of answers to frequently asked questions, and the set-top box 105 may periodically poll the data services system for obtaining updated answers to frequently asked questions.

As described herein, methods and systems of the present invention provide customer support services through interactive television sessions via a cable services network. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of automatically providing customer support services via an interactive television session, comprising:
    launching a customer support services user interface at a customer television set;
    receiving, at a cable services network, customer support information request sent from the customer support user interface;
    providing the customer support information request to an application server at a head end of a cable services network
    receiving at a web services system the customer support information request from the application server at the head end of the cable services network;
    querying, by the web services system, a customer support information system coupled to the web services system for customer support information responsive to the selected customer support information request received by the web services system;
    passing, to a cable services set-top box via the application server at the head end of the cable services network, customer support information responsive to the selected customer support information request obtained by the web services system from the customer support information system; and
    causing the cable services set-top box to present the customer support information responsive to the selected customer support information request at the customer television set.

2. The method of claim 1, after receiving the selected customer support information request, receiving a customer services address for a requesting customer.

3. The method of claim 1, prior to querying the customer support information system via the web services system for customer support information, further comprising calling a customer support services provider via a cable services network.

4. The method of claim 1, prior to passing the customer support information to a cable services set-top box via the cable services network, formatting the customer support information responsive to the selected customer support information request for presentation at the customer television set.

5. The method of claim 1, whereby receiving the selected customer support information request includes receiving a request for work order status information for one or more pending work orders associated with a requesting customer address.

6. The method of claim 5, whereby passing customer support information to a cable services set-top box via the cable services network includes passing work order status information to the cable services set-top box via the cable services network.

7. The method of claim 1, whereby receiving a selected customer support information request includes receiving a request for customer support services contact information.

8. The method of claim 7, whereby passing customer support information to a cable services set-top box via the cable services network includes passing customer services contact information to the cable services set-top box via the cable services network.

9. The method of claim 1, whereby receiving a selected customer support information request includes receiving a request for one or more answers to one or more selected frequently asked questions.

10. The method of claim 9, whereby passing customer support information to a cable services set-top box via the cable services network includes passing the one or more answers to the one or more selected frequently asked questions to the cable services set-top box via the cable services network.

11. The method of claim 1, whereby receiving a selected customer support information request includes receiving a request for billing information associated with a provision of one or more services at a requesting customer service address;
    whereby querying a customer support information system via a web services system for customer support information responsive to the selected customer support information request includes querying a billing system for the billing information associated with the one or more services; and whereby passing the customer support information to a cable services set-top box via the cable services network includes passing the billing information associated with the one or more services to the cable services set-top box via the cable services network.

12. The method of claim 11, further comprising causing the cable services set-top box to present customer support information at the customer television set includes presenting at the customer television set the billing information associated with the provision of the one or more services at the requesting customer service address.

13. The method of claim 12, further comprising:
receiving a selection of one or more of the one or more services for payment; and
receiving a selection of a method of payment for payment of the one or more services selected for payment.

14. The method of claim 13, further comprising presenting at the customer television set a payment user interface pre-filled with billing information for the selected one or more services selected for payment.

15. The method of claim 14, further comprising receiving customer payment information for the selected method of payment.

16. The method of claim 15, whereby receiving customer payment information for the selected method of payment includes receiving identification information for a bank account.

17. The method of claim 15, whereby receiving customer payment information for the selected method of payment includes receiving identification information for a credit card account.

18. The method of claim 15, further comprising determining at the billing system whether the payment information for the selected method of payment is valid payment information.

19. The method of claim 15, further comprising
presenting at the customer television set from the billing system via the web services system, a summary of the payment information received at the billing system; and
presenting a confirmation at the customer television set that payment of the selected one or more services has been made.

20. The method of claim 1,
whereby receiving a selected customer support information request includes receiving a request for automatic bill payment of one or more services at a requesting customer service address;
whereby querying a customer support information system via a web services system for customer support information responsive to the selected customer support information request includes querying a billing system for billing information associated with the one or more services; and
whereby passing the customer support information to a cable services set-top box via the cable services network includes passing the billing information associated with the one or more services to the cable services set-top box via the cable services network.

21. The method of claim 20, further comprising causing the cable services set-top box to present customer support information at the customer television set includes presenting at the customer television set the billing information associated with the one or more services.

22. The method of claim 21, further comprising:
receiving a selection of one or more of the one or more services for automatic periodic billing payment; and
receiving a selection of a method of payment for payment of the one or more services selected for automatic periodic billing payment.

23. The method of claim 22, further comprising a billing payment user interface pre-filled with billing information for the selected one or more services selected for automatic periodic billing payment.

24. The method of claim 23, further comprising receiving customer payment information for the selected method of payment.

25. The method of claim 24, whereby receiving customer payment information includes receiving identification information for a bank account.

26. The method of claim 24, whereby receiving customer payment information for the selected method of payment includes receiving identification information for a credit card account.

27. The method of claim 24, further comprising determining at the billing system whether the customer payment information for the selected method of payment is accurate billing payment information.

28. The method of claim 24, further comprising
presenting at the customer television set from the billing system via the web services system, a summary of the customer payment information received at the billing system; and
presenting a confirmation at the customer television set that automatic period payment of the selected one or more services has been established.

29. A method of receiving bill payment via an interactive television session, comprising:
launching a customer support services user interface at a customer television set;
receiving at a cable services network, a request sent from the customer support user interface for billing information associated with a provision of one or more services at a requesting customer service address;
providing the request for billing information to an application server at a a head end of a cable services network;
receiving at a web services system the request for billing information from the application server at the head end of the cable services network;
querying by the web services system, a customer support information system coupled to the web services system for billing information responsive to the request for billing information received by the web services system;
passing, to a cable services set-top box via the application server at the head end of the cable services network, billing information responsive to the request for billing information obtained by the web services system from the customer support information system; and
causing the cable services set-top box to present the billing information responsive to the request for billing information at the customer television set.

30. The method of claim 29, further comprising:
receiving a selection of one or more of the one or more services for payment; and
receiving a selection of a method of payment for payment of the one or more services selected for payment.

31. The method of claim 30, further comprising presenting at the customer television set a payment user interface pre-filled with billing information for the selected one or more services selected for payment.

32. The method of claim 31, further comprising receiving customer payment information for the selected method of payment.

33. The method of claim 32, further comprising determining at the billing system whether the payment information for the selected method of payment is valid payment information.

34. The method of claim 32, further comprising presenting at the customer television set from the billing system via the web services system, a summary of the payment information received at the billing system; and presenting a confirmation at the customer television set that payment of the selected one or more services has been made.

35. A method of provisioning automatic periodic bill payment for selected accounts via an interactive television session, comprising:

launching a customer support services user interface at a customer television set;

receiving, at a cable services network, a request sent from the customer support user interface for automatic periodic bill payment of one or more services at a requesting customer service address;

providing the request for billing information to an application server at a a head end of a cable services network;

receiving at a web services system the request for billing information from the application server at the head end of the cable services network;

querying by the web services system, a customer support information system coupled to the web services system for billing information responsive to the request for billing information received by the web services system;

passing, to the cable services set-top box via the application server at the head end of the cable services network, billing information responsive to the request for billing information obtained by the web services system from the customer support information system; and causing the cable services set-top box to present the billing information responsive to the request for billing information at the customer television set.

36. The method of claim 35, further comprising:

receiving a selection of one or more of the one or more services for automatic periodic billing payment; and receiving a selection of a method of payment for payment of the one or more services selected for automatic periodic billing payment.

37. The method of claim 36, further comprising presenting at the customer television set a billing payment user interface pre-filled with billing information for the selected one or more services selected for automatic periodic billing payment.

38. The method of claim 37, further comprising receiving customer payment information for the selected method of payment.

39. The method of claim 35, further comprising determining at the billing system whether the customer payment information for the selected method of payment is accurate billing payment information.

40. The method of claim 39, further comprising presenting at the customer television set from the billing system via the web services system, a summary of the customer payment information received at the billing system; and presenting a confirmation at the customer television set that automatic period payment of the selected one or more services has been established.

* * * * *

UNITED STATES PATENT AND TRADEMARK OFFICE
CERTIFICATE OF CORRECTION

PATENT NO. : 7,707,599 B1 Page 1 of 1
APPLICATION NO. : 11/002912
DATED : April 27, 2010
INVENTOR(S) : Vincent Groff et al.

It is certified that error appears in the above-identified patent and that said Letters Patent is hereby corrected as shown below:

Col. 18, line 40 claim 29: "a a head" should read --a head--

Col. 19, line 22 claim 35: "a a head" should read --a head--

Signed and Sealed this

Nineteenth Day of October, 2010

David J. Kappos
*Director of the United States Patent and Trademark Office*